United States Patent [19]

Agrawal et al.

[11] 4,348,066
[45] Sep. 7, 1982

[54] FOIL BEARING MOUNTING

[75] Inventors: Giridhari L. Agrawal, Torrance; Edward J. Hockey, Vista, both of Calif.

[73] Assignee: The Garrett Corporation, Los Angeles, Calif.

[21] Appl. No.: 235,061

[22] Filed: Feb. 17, 1981

Related U.S. Application Data

[63] Continuation of Ser. No. 47,601, Jun. 11, 1979, abandoned.

[51] Int. Cl.³ .......................................... F16C 32/06
[52] U.S. Cl. ............................... 308/9; 308/DIG. 1
[58] Field of Search ................ 308/9, DIG. 1, 164, 308/121, 5 R, 170, 122

[56] References Cited

U.S. PATENT DOCUMENTS

| 3,366,427 | 1/1968 | Silver et al. | 308/122 |
| 3,375,046 | 3/1968 | Marley | 308/164 |
| 3,382,014 | 5/1968 | Marley | 308/9 |
| 3,511,544 | 5/1970 | Marley | 308/3 |
| 3,615,121 | 10/1971 | Barnett et al. | 308/9 |
| 3,747,997 | 7/1973 | Winn | 308/9 |
| 3,809,443 | 5/1974 | Cherubim | 308/9 |
| 4,153,315 | 5/1979 | Silver et al. | 308/121 |

Primary Examiner—Lenard A. Footland
Attorney, Agent, or Firm—Albert J. Miller

[57] ABSTRACT

Means for and a method of mounting compliant foils in a fluid bearing.

13 Claims, 4 Drawing Figures

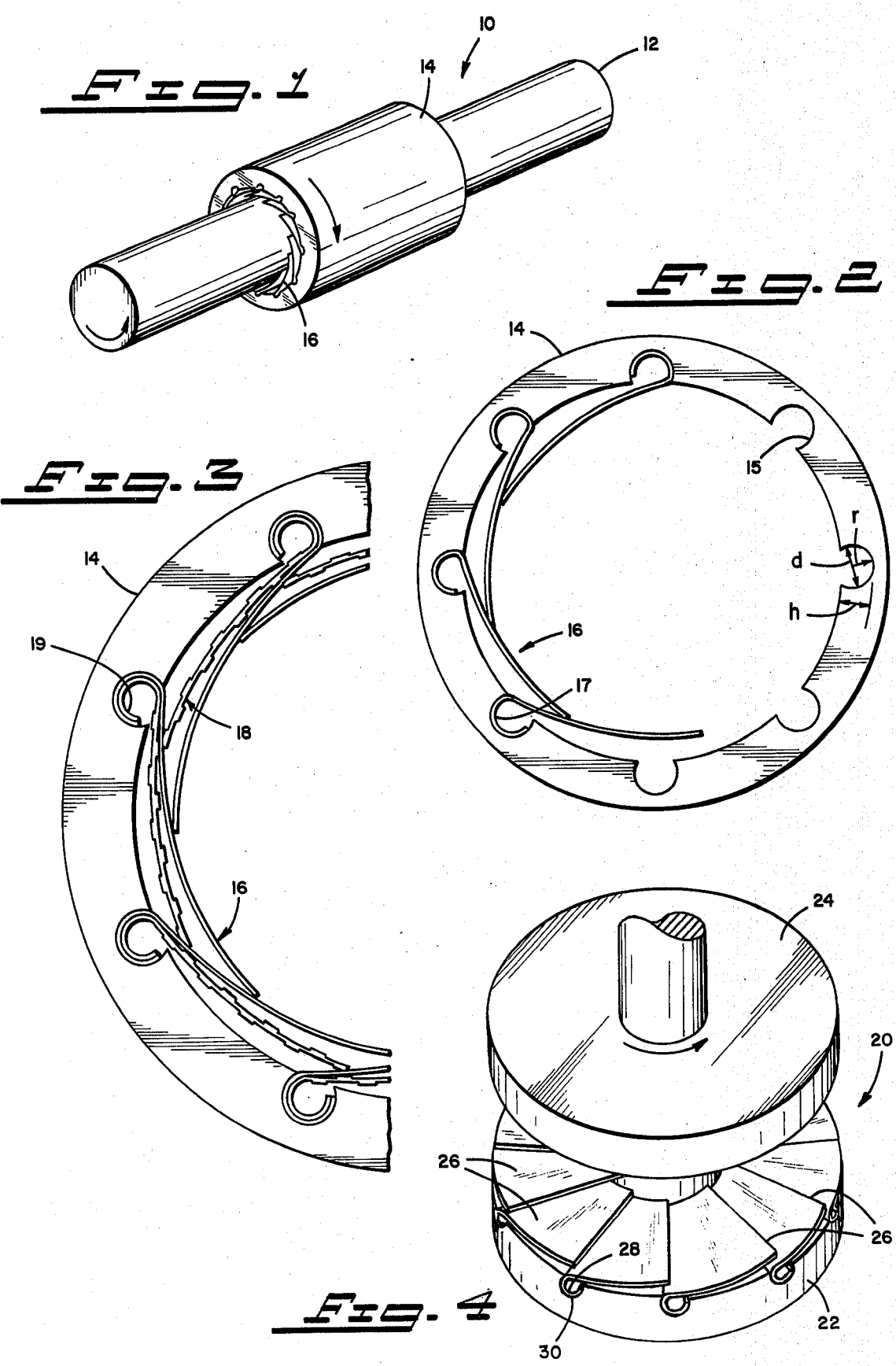

FOIL BEARING MOUNTING

This is a continuation of application Ser. No. 047,601 filed June 11, 1979, abandoned.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions forms a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

Illustrative of hydrodynamic and/or hydrostatic bearing patents assigned to the same Assignee of this application are U.S. Pat. Nos.: 3,215,479; 3,215,480; 3,366,427; 3,375,046; 3,382,014; 3,434,762; 3,467,451; 3,511,544; 3,560,064; 3,615,121; 3,635,534; 3,642,331; 3,677,612 and 3,893,733.

In order to properly position the compliant foils between the relatively movable bearing elements, a number of mounting means have been devised. The most common practice, as exemplified in U.S. Pat. Nos. 3,366,427, 3,375,046 and 3,615,121, is to attach a rod or bar to one end of the foil which can then be retained in a slot or groove in one of the relatively movable bearing elements. Alternately, as exemplified in U.S. Pat. Nos. 3,382,014 and 3,809,433, a plurality of overlapping foils may be individually mounted on a foil base such as by spot welds. The base would then be frictionally held against one of the relatively movable bearing elements. Further a lip or projection at one end of the foil may be restricted in a slot or groove in one of the relatively movable elements. Examples of this type of mounting can be found in U.S. Pat. Nos. 3,511,544, 3,747,997, 3,809,443 and 3,382,014. Additionally, the individual foils have been mounted intermediate the ends thereof as described in U.S. Ser. No. 659,619 filed May 25, 1976, now U.S. Pat. No. 4,178,046 issued Dec. 11, 1979, and assigned to the same Assignee as this application.

In order to establish stability of the foils in most of these prior mounting means, a substantial pre-load is required on the foil, that is, the individual foils must be loaded against the relatively movable bearing element opposed to the bearing element upon which the foils are mounted. This pre-load however results in a higher starting torque and can create severe wear requirements on the foils and also will likely reduce the net load carrying capacity of the bearing.

SUMMARY OF THE INVENTION

By specifically configuring circular slots in one of the relatively movable bearing elements and by conforming one end of each of the foils to the same configuration, the present invention provides a mounting means which greatly reduces the amount of pre-load required on the foils in the fluid bearing system. In essence, a "hinge" is provided between the end of the foil and the bearing element upon which it is mounted.

In one of the relatively movable elements, a plurality of circular slots having a depth less than the diameter of the slot but greater than the radius of the slot is provided along one surface of the element. The end of each foil which is to be inserted into these circular slots has a circular loop configuration with the outer diameter of this circular loop generally conforming to the diameter of the individual circular slots.

BRIEF DESCRIPTION OF THE DRAWING

FIG. 1 is a perspective view of a foil journal bearing having the mounting means of the present invention;

FIG. 2 is an enlarged end view of the journal bushing of the foil bearing of FIG. 1 including some of the plurality of individual foil members mounted therein;

FIG. 3 is a partial, enlarged end view of an alternate embodiment of the present invention wherein a separate stiffener element is utilized with the individual foil members; and FIG. 4 is a perspective view of a foil thrust bearing having the mounting means of the present invention.

DETAILED DESCRIPTION OF THE PREFERRED EMBODIMENTS

Referring now to FIG. 1, there is illustrated a foil journal bearing 10 having a shaft 12 rotatably disposed with respect to a bushing 14. Disposed between the shaft 12 and bushing 14 are a plurality of individual, overlapping bearing foils 16. Arrows on the end of the shaft 12 and the exterior of the bushing 14 indicate the direction of relative rotation between the shaft and bushing. It is not necessary that both the shaft and the bushing rotate. One or either of the shaft or the bushing may be stationary. It is only necessary that the relative rotation between the shaft and the bushing be in the direction indicated.

As more clearly illustrated in FIG. 2, the bushing 14 on its inner diameter includes a plurality of uniformly spaced circular slots 15. Each of these slots has a depth "h" which is less than the diameter "d" of the slot but greater than the radius "r" thereof. While for purposes of illustration the number of slots is shown as eight, the actual number to be utilized will be determined by the specific application of the bearing.

The individual bearing foils 16 comprise a thin, compliant, arcuate element generally of a metallic material. At one end of the bearing foils 16 is a circular loop 17 which is to be pivotally disposed within a circular slot 15 of the bushing 14. The outer diameter of the circular loop 17 would be slightly less than the diameter of the circular slot 15 such that the loops could be snapped or slide into the slot 15 such that the foil 16 would be free to pivot within the slot 15 without undue force being required. A mild interference fit between the loops 17 and slots 15 is contemplated. In order to maintain the loops 17 in the slots 15, the loops 17 should be at least 180°.

As illustrated in FIG. 3, the foils 16 may be utilized in conjunction with a stiffener or underfoil 18, the underfoil 18 having alternate grooves and ridges so as to provide both a bending and compressive mode of operation. More details with respect to the stiffening elements can be found in U.S. Pat. No. 4,153,315 assigned to the same Assignee as this application. Each stiffener 18 will include a circular loop 19 adapted to be disposed within the circular loop 17 of the individual foils 16 such that the foils and stiffener can both independently pivot with respect to each other within the circular slots 15 of the bushing 14.

While the embodiments of FIGS. 1-3 have been directed to a journal bearing application, it should be recognized that the mounting means of the present invention are also applicable to other types of fluid bearing arrangements, for example, thrust bearings and conical bearings. FIG. 4 illustrates a thrust bearing application for this mounting means. The foil thrust bearing 20 includes a thrust plate 22 and a thrust runner 24 rotatably disposed with respect to each other. Positioned between the thrust plate 22 and the thrust runner 24 are a plurality of individual, overlapping bearing foils 26. The direction of relative rotation between the thrust plate 22 and the thrust runner 24 is indicated by an arrow on the thrust runner 24. Each individual foil 26 includes a circular loop 28 adapted to be mounted within a corresponding circular slot 30 in the thrust plate 22 in the same manner as described in detail with respect to the journal bearing figures.

As can be seen, the mounting means of the present invention provides a joint which acts as a hinge for the bearing foils. Since the depth of the circular slots is less than the diameter but more than the radius thereof, the foil element loops have no tendency to come out even when the foil is unloaded. Accordingly, the foils require much less pre-load than foils mounted in the conventional manner. In addition, the foils will tend to follow the relatively movable surface which they are supporting even at higher speeds.

With the reduced pre-load, less starting torque is required to initiate liftoff of the foils. The net load bearing capability of the foils is also increased as a result of the reduced pre-load. Additional advantages include better stability and the ability to withstand higher surface speeds. Since the foils follow or track better when mounted in this fashion, better damping characteristics will be present.

While specific embodiments of the invention have been illustrated and described, it is to be understood there are provided by way of example only, and that the invention is not to be construed as being limited thereto, but only by the proper scope of the following claims:

We claim:
1. A fluid bearing comprising:
a pair of members arranged for relative movement with respect to one another, one of said pair of members having a plurality of circular slots having a depth less than the diameter but greater than the radius of the slots to form lip means at the edge of the slots at the surface of said one of said pair of members; and
a plurality of compliant foils operably disposed between said pair of relatively movable members, each of said plurality of compliant foils having at one end thereof a circular loop having an outer diameter slightly less than the diameter of the circular slots, said loop pivotably disposed in a corresponding circular slot of said one of said pair of relatively movable members and restrained by the lip means at the edge of the slot.

2. The fluid bearing of claim 1 wherein said fluid bearing is a journal bearing.

3. The fluid bearing of claim 1 wherein said fluid bearing is a thrust bearing.

4. A fluid bearing comprising:
a bearing support member having an opening to receive a rotatable shaft and having a plurality of circular slots of a depth less than the diameter but greater than the radius of the slots to form lip means at the edge of the slots at the surface of the bearing support member;
a rotatable shaft operably disposed within the opening of said bearing support member; and
a plurality of compliant overlapping foils operably disposed between the rotatable shaft and the bearing support member, each of said plurality of compliant foils having at one end thereof a circular loop having an outer diameter slightly less than the diameter of the circular slots, said loop disposed in a corresponding circular slot in said bearing support member whereby said circular loop is pivotable within said slot and radially restrained therein by said lip means at the edge of said slot.

5. A fluid bearing comprising:
a bearing support member having an opening to receive a rotatable shaft and having a plurality of circular slots of a depth less than the diameter but greater than the radius of the slots;
a rotatable shaft operably disposed within the opening of said bearing support member;
a plurality of compliant overlapping foils operably disposed between the rotatable shaft and the bearing support member, each of said plurality of compliant foils having at one end thereof a circular loop pivotably disposed and radially restrained in a corresponding circular slot in said bearing support member; and
a plurality of foil stiffening elements, a foil stiffening element disposed between each of said plurality of compliant foils and the bearing support member, said foil stiffening element comprising an arcuate portion underneath the foils and a circular loop at one end thereof pivotably disposed but otherwise restrained within a corresponding circular loop of the foils.

6. The fluid bearing of claims 1, 4, or 5 wherein said fluid bearing is hydrodynamic.

7. The fluid bearing of claims 1, 4, or 5 wherein said fluid bearing is hydrostatic.

8. The fluid bearing of claims 1, 4, or 5 wherein said circular loop at one end of each of said plurality of compliant foils is at least 180°.

9. The fluid bearing of claim 1 or 4 and in addition a plurality of foil stiffening elements, a foil stiffening element disposed between each of said plurality of compliant foils and the bearing support member, said foil stiffening element comprising an arcuate portion underneath the foils and a circular loop at one end thereof pivotably disposed but otherwise restrained within a corresponding circular loop of the foils.

10. A method of supporting relative movement between two members, one of which being supportive of the other, comprising the steps of:
   providing a plurality of circular slots on the surface of one of said members facing the other of said members, each of said slots having an opening at the surface of the one of said members less than the slot diameter;
   providing a plurality of compliant, overlapping foils between the two members, each foil having at one end thereof a circular loop of at least 180° having an outer diameter slightly less than the diameter of the circular slots but greater than the slot opening; and
   pivotably disposing but otherwise restraining the circular loop of each foil in a corresponding circular slot in said one of said members.

11. A fluid bearing comprising:
   a plurality of compliant foils, each of said plurality of compliant foils having at one end thereof a circular loop of at least 180°; and
   a pair of members arranged for relative movement with respect to one another and operably disposed around the plurality of compliant foils, one of said pair of members having a plurality of circular slots with an opening at the surface thereof less than the slot diameter to receive the loops at one end of the compliant foils, the loop at one end of each compliant foil having an outer diameter less than the slot diameter but greater than the slot opening so as to be laterally and perpendicularly restrained along the surface of said one of said pair of members but free to pivot with respect thereto.

12. A fluid bearing comprising:
   a bearing support member having a bushing to receive a rotatable shaft and having a plurality of circular slots in the shaft receiving bushing, said slots having a slot opening less than the slot diameter;
   a rotatable shaft operable disposed within the bushing of said bearing support member; and
   a plurality of compliant overlapping foils operably disposed between the rotatable shaft and the bearing support member, each of said plurality of compliant foils having at one end thereof a circular loop of at least 180° and having an outer diameter slightly less than the diameter of the circular slots but greater than the slot opening, said loop disposed in a corresponding circular slot in said bearing support member whereby said circular loop is pivotable within said slot and radially restrained therein.

13. A method of supporting relative movement between two members, one of which being supportive of the other, comprising the steps of:
   providing a plurality of circular slots having a depth less than the diameter but greater than the radius of the slots on the surface of one of said members facing the other of said members to form a pair of lips at the edge of the slots;
   providing a plurality of compliant, overlapping foils between the two members, each foil having at one end thereof a circular loop having an outer diameter slightly less than the diameter of the circular slots; and
   pivotably disposing but otherwise restraining by the pair of lip means the circular loop of each foil in a corresponding circular slot in said one of said members.

* * * * *